F. HEYL.

Assignor to G. D., N. & M. S. DRAKE.

CHAMBER PAIL AND OTHER VESSEL.

No. 10,369. Reissued Aug. 21, 1883.

Attest:
T. F. Campbell
Chas. F. Kerr.

Inventor:
Frederick Heyl,
by Drake & Co, Attys.

N. PETERS, Photo-Lithographer, Washington, D. C.

UNITED STATES PATENT OFFICE.

FREDERICK HEYL, OF IRVINGTON, ASSIGNOR TO GEORGE D. DRAKE, OF NEWARK, AND NATHANIEL DRAKE AND MAHLON S. DRAKE, OF IRVINGTON, NEW JERSEY.

CHAMBER-PAIL AND OTHER VESSELS.

SPECIFICATION forming part of Reissued Letters Patent No. 10,369, dated August 21, 1883.

Original No. 250,243, dated November 29, 1881. Application for reissue filed July 18, 1883.

*To all whom it may concern:*

Be it known that I, FREDERICK HEYL, a citizen of the United States, and a resident at Irvington, in the county of Essex and State of New Jersey, have invented certain new and useful Improvements in Chamber-Pails and other Vessels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates more especially to lids or covers for chamber-pails and other vessels, and means for fastening said lids or covers over or upon the apertures in such vessels, the object being to facilitate the fastening of said lids or covers, and also to prevent the escape of gases from or the entrance of air in said vessels when the covers have been fastened.

These improvements render the invention especially applicable to that class of vessels intended to serve the ordinary purpose of a chamber-pail, and also to serve as a vessel on which to stool.

The invention consists in the arrangement and combinations of parts, substantially as will be hereinafter set forth, and finally embraced in the claims.

Figure 1:
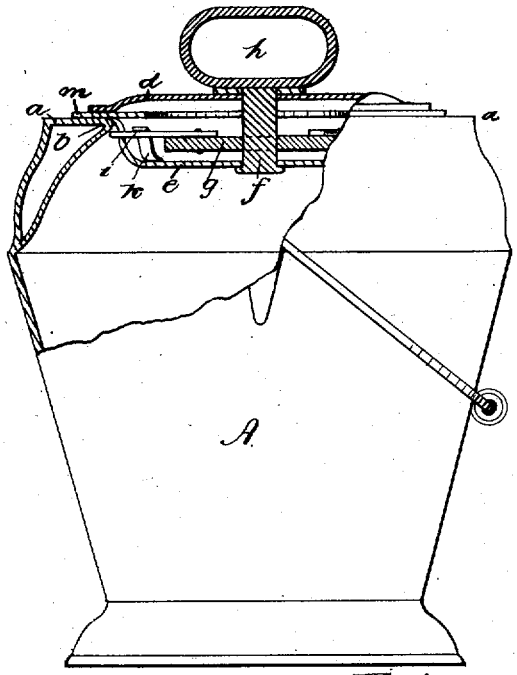
Figure 2:
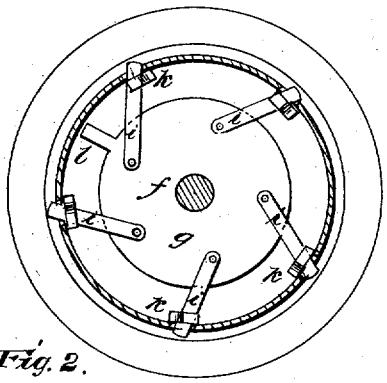

Referring to the accompanying drawings, in which similar letters of reference indicate corresponding parts in each of the figures, Figure 1 represents an elevation of a pail, partially in section to show the arrangement of the several parts; and Fig. 2 is a plan of the under side of the lid or cover, indicating more clearly the operation of certain mechanism for fastening the lid down upon its seat.

In carrying out my invention with reference to a chamber-pail I construct the latter, A, in the usual manner, the upper or seat portion, *a*, being rounded, as indicated in sectional portion of Fig. 1, in order to afford comfort to a person seated thereon. From the inner rim, *b*, of the seat the inner wall of the pail tapers, or is beveled downwardly and outwardly, as shown, for a purpose hereinafter made manifest.

The pail or vessel being formed, I construct the lid or cover substantially as follows: Between an upper plate, *d*, and a dish-shaped under plate, *e*, I secure upon a shaft or spindle, *f*, a disk, *g*, which is adapted to rotate with said spindle when the latter is actuated by a suitable handle, *h*, which also serves as a means by which to raise the lid, as will be obvious. Connected with said disk or plate *g* are arms *i*, which are loosely riveted or pivoted at proper distances apart upon the face of said disk or plate, and project therefrom obliquely or in a manner approaching a tangential direction, and passing or being adapted to pass through perforations in the side wall of said dish-shaped under plate, as indicated in the drawings. When the handle *h*, spindle *f*, and disk *g* are turned, and the tangential direction of the arms approaches a radial, as will be understood, said arms, which work loosely upon the disk, will be projected through the perforations above referred to, and will pass under the rim of the vessel, to which the lid may be adjusted, and thereby hold said lid firmly upon its seat.

At the inner edges of the perforations are arranged guards *k*, which hold the outer extremities of the arms *i* in position and prevent them from becoming disarranged when they are drawn back to disengage the lid.

In order to limit the rotation of the disk in either direction, and so prevent accidental disarrangement of the mechanism, the disk is provided with a stop-lug, *l*, arranged to engage with one of the guards *k* on either side when the arms are thrust in or out, as will be understood by reference to Fig. 2. As a further precaution the arms *i* are arranged so as to engage with the guards *k* and with the plate *e* when said arms are thrust out to their fullest extremity, as indicated in the same figure.

Between the upper and lower plates is arranged and secured a rubber washer or packing, *m*, which projects beyond the under plate, as shown, so that when the lid or cover is in position upon its seat said washer or packing will lie between the upper plate and said seat, and when the arms are projected in the manner hereinbefore set forth, pressure will be brought to bear upon the upper plate and upon the packing to form an air-tight joint, as will be understood by reference to Fig. 1, the pressure being produced by the projecting arms engaging with the inclined walls of the vessel.

Having thus described my invention, what I claim, and desire to secure by Letters Patent, is—

1. The combination, with a chamber-pail or other vessel, of a lid or cover having an upper and a lower plate, a rubber washer or packing secured between said plates, a spindle and disk connected with a handle and working between said plates, and arms working on said disk and adapted to engage with the rim of said vessel to hold the lid or cover thereon, all substantially as set forth.

2. The combination, with an upper and a lower plate having a packing between them, of a disk working on a spindle in said plates, and having arms and a stop-lug thereon, all arranged and operating substantially as and for the purposes set forth.

3. In a cover for chamber-pails and other vessels, an upper plate adapted to rest upon the top of said vessel, a lower plate having perforated side walls, adapted to pass into the mouth of the vessel, and arms connected with a spindle passing through said plates, and adapted to engage with the under side of the rim of said vessel, all arranged and operating substantially as and for the purposes set forth.

In testimony that I claim the foregoing I hereto set my hand this 27th day of June, 1883, in presence of two witnesses.

FREDERICK HEYL.

Witnesses:
OLIVER DRAKE,
CHARLES H. PAULUS.